(12) United States Patent
Huggins et al.

(10) Patent No.: US 9,170,847 B2
(45) Date of Patent: Oct. 27, 2015

(54) REAL TIME VERIFICATION OF WEB APPLICATIONS

(75) Inventors: Jason Huggins, Oak Park, IL (US);
Steven Hazel, San Francisco, CA (US);
John Dunham, San Francisco, CA (US)

(73) Assignee: Sauce Labs, Inc., San Francisco, CA (US)

( * ) Notice: Subject to any disclaimer, the term of this patent is extended or adjusted under 35 U.S.C. 154(b) by 758 days.

(21) Appl. No.: 12/987,936

(22) Filed: Jan. 10, 2011

(65) Prior Publication Data

US 2012/0017210 A1 Jan. 19, 2012

Related U.S. Application Data

(60) Provisional application No. 61/293,606, filed on Jan. 8, 2010.

(51) Int. Cl.
*G06F 15/173* (2006.01)
*G06F 9/50* (2006.01)
(Continued)

(52) U.S. Cl.
CPC .............. *G06F 9/5055* (2013.01); *G06F 21/53* (2013.01); *G06F 21/566* (2013.01); *H04L 67/1002* (2013.01); *H04L 67/1008* (2013.01);
(Continued)

(58) Field of Classification Search
CPC ... H04L 67/02; H04L 69/329; H04L 12/2697; H04L 43/50; G06F 9/44526; G06F 9/45504; G06F 9/45558; G06F 8/60; G06F 11/1482; G06F 11/3688; G06F 11/3692; G06F 11/3672; G06F 11/3414; G06F 2221/033; G06F 11/3664

USPC .......................................................... 709/226
See application file for complete search history.

(56) References Cited

U.S. PATENT DOCUMENTS 7,596,620 B1    9/2009  Colton et al.
8,219,987 B1 *  7/2012  Vlaovic et al. .................... 718/1
(Continued)

OTHER PUBLICATIONS

Raj, H., et al., Resource Management for Isolation Enhanced Cloud Services, 2009 ACM Workshop on Cloud Computing, Nov. 13, 2009, pp. 77-84, ACM See Abstract, Chpt. 2 and Fig. 1.

(Continued)

Primary Examiner — Glenton B Burgess
Assistant Examiner — Imran Moorad
(74) Attorney, Agent, or Firm — Cascio & Zervas; Anthony Ti. Cascio; Charles H. Jew

(57) ABSTRACT

A software verification system including a cloud service, a plurality of test nodes, a client manager, and an expediter is disclosed. The cloud service is a commercially available shared resource service having two or more physical machines, each of which is configured to host a plurality of virtual machines. Each test node is one virtual machine running a platform. The client manager manages a verification session between one of the clients and the verification system. The expediter recognizes the available platforms for use by the test nodes in a cloud service pool of servers and a local pool of servers. When a clients requests the verification session to use a specific platform, the expediter obtains a network address of an available test node running the specified platform and connects the requesting client to the available test node running the requested platform. If the requested platform is not available, a new virtual machine, located in the local pool of servers, having the requested platform is started and connected with the requesting client.

19 Claims, 2 Drawing Sheets

(51) Int. Cl.
  *G06F 21/53* (2013.01)
  *G06F 21/56* (2013.01)
  *H04L 29/08* (2006.01)
  *H04L 29/06* (2006.01)

(52) U.S. Cl.
  CPC ... *G06F2209/5011* (2013.01); *G06F 2221/033* (2013.01); *G06F 2221/2115* (2013.01); *G06F 2221/2119* (2013.01); *G06F 2221/2149* (2013.01); *H04L 63/08* (2013.01)

(56) References Cited

U.S. PATENT DOCUMENTS

| | | | |
|---|---|---|---|
| 8,307,362 B1* | 11/2012 | Gong et al. | 718/1 |
| 8,347,263 B1* | 1/2013 | Offer | 717/104 |
| 2004/0148608 A1* | 7/2004 | Gendreau et al. | 719/310 |
| 2006/0212514 A1* | 9/2006 | Saillet | 709/203 |
| 2007/0174429 A1* | 7/2007 | Mazzaferri et al. | 709/218 |
| 2008/0301770 A1* | 12/2008 | Kinder | 726/2 |
| 2009/0193074 A1 | 7/2009 | Lee | |
| 2009/0235172 A1* | 9/2009 | Gandhi et al. | 715/733 |
| 2010/0138898 A1* | 6/2010 | He et al. | 726/3 |
| 2010/0180014 A1* | 7/2010 | Kannan et al. | 709/220 |
| 2010/0332629 A1* | 12/2010 | Cotugno et al. | 709/221 |

OTHER PUBLICATIONS

Dan. A., et al., Connecting Client Objectives with Resource Capabilities: An Essential Component for Grid Service Management, 2nd International Conference on Service Oriented Computing, 2004, pp. 57-64, ACM. See Chpt. 3.1.

* cited by examiner

REAL TIME VERIFICATION OF WEB APPLICATIONS

CROSS-REFERENCE TO RELATED APPLICATIONS

This application claims benefit of priority of U.S. provisional application, Real Time Verification of Web Application in Virtual Space, Ser. No. 61/293,606 filed on Jan. 8, 2010, incorporated herein by reference.

TECHNICAL FIELD OF THE INVENTION

The present invention relates generally to concurrent availability of virtual machines in a cloud service and more particularly to novel apparatus and methods for minimizing the time in which a virtual machine with a predetermined platform becomes available to a network connected client.

BACKGROUND OF THE INVENTION

A web application generally refers to a server hosted software application that is accessed via a client resident web browser running over a network such as the Internet. Web application may also refer to such server software application that is coded in browser supported languages, such as HTML, JavaScript, Java, etc., and reliant on the client web browser to render the application executable. Accordingly, web applications may exemplarily include any of web pages, web sites, remotely executable applications and application modules, scripts, objects, applets, interfaces and the like, and any and all other instruction sets or procedures that can be remotely executed on a server through a browser interface at a client in network communication with the server with the results of such execution being returned to the client and rendered at the browser interface.

In a cloud service, which conventionally is a commercially available shared resource service, a single physical machine will be configured to host a plurality of virtual machines. Typically, a provider of the cloud service will have multiple physical machines, each of which hosts respective ones of the plurality of virtual machines.

Generally, any one of the virtual machines may be made available to a network connected client, generally upon presentation and authentication of credentials needed to access the cloud service, such that a connection can be established between the network client and the available virtual machine. Once the connection has been established, the network connected client may launch, run or execute one or more programs on the connected virtual machine at which substantially all I/O operations occur under the control of the network connected client as if such programs were being executed locally.

Additionally, the client, prior to launching and running any application in the cloud service may specify either or both of a particular release version of such application and a particular release version of the operating system upon which such application is to run. Taken together, the application and operating system version are referred to herein as a platform. Upon request by the network connected client for a particular platform, the cloud service determines if such platform currently exists and is otherwise idle, and therefore available for connection with such client.

Should the requested platform be available, the cloud service will accommodate the request and connect the client to the virtual machine having the requested platform. However, in the event no such idle virtual machine having the requested platform is available, then the cloud service will issue a run command to start a new virtual machine with such platform.

Typically, the cloud service may have an image cache of virtual machine images from which an image of such platform can be copied, should an image for such platform already exist. If an image does exist for the specified platform, the image is copied to the physical machine and the new virtual machine is started from such image, as is conventionally known. Once the image is copied and the virtual machine is available for use, the physical machine then sends an indication thereof to the cloud service. The cloud service may then in turn notify the network client of the availability of the virtual machine, thereby allowing connection by the network client to such virtual machine.

However, a significant time delay exists from the time that the cloud service issues the run command to the time the new virtual machine is running and available for connection with the client. This inherent time delay disadvantageously limits the ability of the client to execute a desired application on the virtual machine in real time.

Moreover, if an image of the desired platform does not exist in the image cache, then the cloud service must start a new virtual machine, and once started then configure it for such platform. It should be recognized by those skilled in the art that the time interval from which a request for a specific platform is made until such time a virtual machine is started, configured to have the specified platform, and finally made available to the network client would be unacceptably excessive.

Even when the virtual machine with the desired platform can be started from an image copied from the image cache, the inherent time delay is nonetheless disadvantageous to users who need access to multiple platforms provided by the cloud service in real time. For example, such users may include web application developers who need to verify that their applications will execute properly on any one of the potential platforms that may exist on any one of a variety of clients of various makes and models used to access such applications.

In the above referenced related application, a web application verification system for such developers is disclosed. The disclosed verification system is useful to verify in real time the compatibility of a web application on a test node of a specified platform. Exemplarily, the web application is to be hosted on a server generally accessible to Internet users, each having any one of the variety of network clients as discussed above. To perform the test, the web developer will go through the verification system command test nodes, each of which may be a virtual machine of a respective specified platform in the cloud service, to access the hosted web application and perform various test operations thereat. Results of the test operations may be recorded at each of the test nodes and made available to the web developer through the verification system.

More particularly, the disclosed verification system includes, in addition to the test nodes, a client manager and an expediter. The client manager is operative to manage a session between the verification system and the network client that has connected to the verification system. The expediter is made cognizant of all available test nodes and their respective platforms in the cloud service.

During the session, the developer at the developer client will for each compatibility test to be run specify the desired platform on which test commands selected by the developer are to execute. If a test node having the specified platform is currently available, the expediter will inform the client manager of such availability by giving to the client manager the location of such test node, typically specified by its URL, so that the client manager can connect thereto.

In the event a test node for the specified platform is not currently available when requested, the expediter will endeavor to launch a new test node having such platform. However, in the cloud service as described above, the wait time until such server is launched and becomes available to the client may result in excessive delay, typically on the order of tens of minutes.

To mitigate such delay, the related application discloses therein that the verification system may further include a local server pool, which may be local test nodes configured as either or both of static or virtual machines. In the event the expediter is unable to locate one or more test nodes of the required platform in the cloud service, the expediter will look to the local server pool and make one of its test nodes that matches the required platform available to the client.

In the event the local pool does not currently contain a test node of the requisite platform, the expediter is operative to cause a new test node with such platform to be launched in the local pool and then be made available to the session client, as discussed above. Since a test node in the local server pool can be launched in only several seconds, the wait time until it becomes available to the session client is accordingly minimal, thereby allowing the test to proceed in real time.

As the test node in the local pool is made available, the expediter will also request the cloud service to provide an additional test node matching the platform of the local pool test node currently in use. As soon as the test node in the cloud service becomes available, the expediter, as disclosed in the related application, will direct all further tests to the cloud service test node of the identical platform configuration. Accordingly, as disclosed in the related application, the local pool acts as a short term "burst" server, wherein the virtual machines running in the pool are to be maintained optimally as idle.

SUMMARY OF THE INVENTION

According to the present invention, the local pool includes a cache of virtual machine snapshots. Each of these snapshots is a platform that can be launched on an existing virtual machine, thereby obviating the need to launch a new virtual machine with such platform. The snapshot cache further advantageously mitigates delay in providing a platform to the network connected client in real time.

At the time the network client requests a platform that is not currently available, the expediter issues a command to copy an image from the local cache to a virtual machine running on the local pool. Simultaneously therewith, the cloud service is also instructed to prepare an image from which a virtual machine can be started with the desired platform.

In a further embodiment of the present invention, the snapshot image can be copied directly into RAM of the local pool. Accordingly, the virtual machine can be started directly from the snapshot image thereby advantageously avoiding the startup parameters of the virtual machine.

Furthermore, the pool server may also advantageously be used as a platform source in concert with the cloud service, and not restricted to burst operation only as previously disclosed. For example, access to platforms in the cloud service can be restricted to those developer clients that have been previously authenticated and credentialed by the verification system to access the cloud service platforms in addition to the local pool. In such event, access by properly authenticated and credentialed users could be to platforms in either or both of the local pool and cloud service as needed. Moreover, the expediter may further deploy a platform in the cloud service for such authenticated and credentialed users currently accessing platforms in the local pool to later transfer such users to the newly deployed platforms to make available the virtual machines in the local pool. All other users would be restricted to the local pool only.

In yet another embodiment of the present invention, during the conduct of a user session in which a web application is being verified at a test node, a real time video of the screen display as the test running at the platform may be recorded. The video records a frame buffer of the browser window running at the test node, which is streamed to the developer client. This feature advantageously allows the test being conducted to be modified in real time without the necessity of additional setup as would be required with only static screen shots of the test being provided as in the above referenced application.

In yet another embodiment of the present invention, a web application verification system to verify in real time the compatibility of a web application on a test node having a specified platform includes a client manager and an expediter. The client manager manages a session between the verification system and a connected session client. A user at the client specifies the platform of a test node for the session. The expediter is cognizant of all available test nodes and their respective platforms and, if such specified platform is available, the expediter will inform the client manager of the availability of such test node and further give the client manager the location thereof so that the client manager can connect thereto. Otherwise, the expediter will launch a new test node having the specified platform.

Once the test node is acquired and connected, the user at the session client gives the URL of the web application to be tested, to which the browser of the test node navigates. The user may then enter a series of commands for actions to be taken by the browser of the test node on a web application. As each command is given and a response is returned to the browser of the test node and data is collected into a data file as to the browser process taken on the test node. Screen shots and video of the browser window at the test node may also be made synchronized to the collected data. At the end of the session, the captured screen shots and data are returned to the user.

In yet another aspect of the present invention, each of the test nodes is a virtual server in a cloud based service. The testing system may further include a plurality of local test nodes configured as static servers. In the event the expediter is unable to locate one or more virtual server test nodes of the required platform, the expediter will send the URL to one of the static server test nodes that matches the platform required. In a further embodiment of the present invention, the expediter will further request the virtual server test node service to provide additional test matching the platform of the static servers currently in use. As soon as such virtual server test nodes become available, the expediter will direct all further tests to a virtual server test node of the identical platform configuration.

These and other objects, advantages and features of the present invention will become readily apparent to those skilled in the art from a study of the following Description of the Exemplary Preferred Embodiments when read in conjunction with the attached Drawings.

DESCRIPTION OF THE EXEMPLARY PREFERRED EMBODIMENTS

Figure 1:
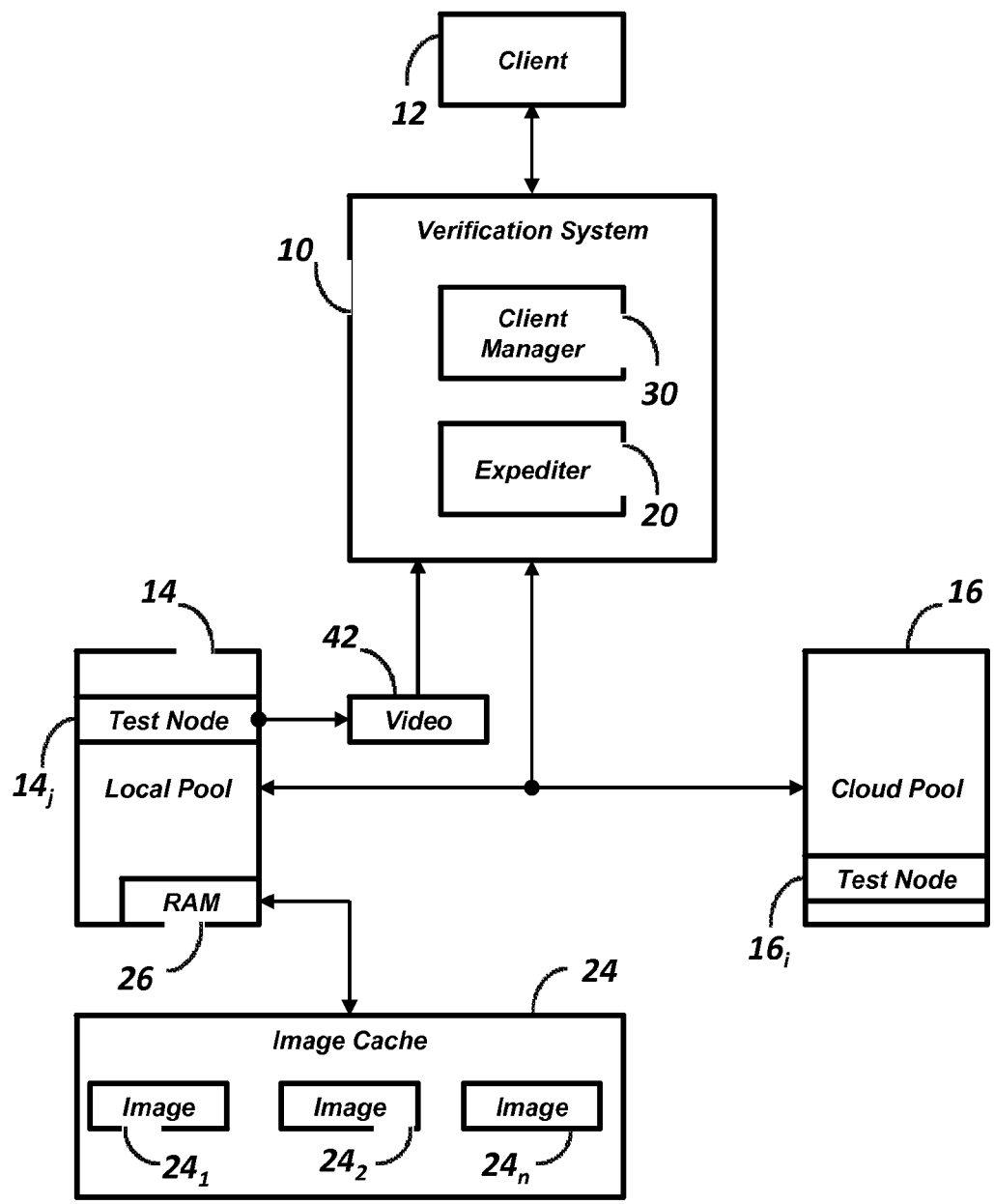
FIG. 1 is a schematic block diagram of a software verification system constructed according to the principles of the present invention.

Referring now to FIG. 1, a web application verification system 10 is shown, which may be constructed as described. A developer client 12 may connect to the verification system 10 over a network for testing a web application at a remote test node $16_i$ provided as a platform at a cloud service 16 or at a local test node $14_j$ provided as a platform at a local virtual machine pool 14.

Also as disclosed in the referenced application, the verification system 10 includes a client manager 30 and an expediter 20. The client manager 30 manages a session between the developer client 12 and the verification system 10. The expediter 20 is cognizant of each of the available platforms available for test nodes in each of the cloud service pool 14 and local pool 14. When the developer client 12 requests a new session, the client manager will obtain a URL of an available test node of the desired platform from the expediter and send such URL to the developer client, which may then in turn connect to the test node having such URL to conduct the verification session. For example, if the URL is for test node $14_i$ provided at the local pool 14, then the connection will be there between.

Additionally, during the testing session, a real time video may be obtained of the browser window. In this regard, a video interface 42 may collect frame buffer information of the browser running at the test node $14_j$ and transmit such information to the developer client 12 through the connection established. The frame buffer information may then be used to reproduce the browser screen of the test node $14_i$ at the developer client 12.

The verification system may further include an image cache 24, in which is stored a plurality of virtual machine images or snapshots $24_1$, $24_2$, ..., $24_n$ for various platforms. When a request is made for a platform that is not currently running in the cloud pool 16 local pool 14, the expediter will cause one of the images $24_1$, $24_2$, ..., $24_n$ that matches such platform to be copied to an available virtual machine in the local pool 16. Preferably, the selected one of the images $24_1$, $24_2$, ..., $24_n$ is copied directly into a RAM 26 of the local pool 14. The image cache 24 may be populated by snapshots taken of virtual machines configured for specific platforms. Copying an image into RAM obviates the need to configure startup parameters of the virtual machine.

When the client session under the control of the client manager 30 has been authenticated and credentialed, the expediter can then make any virtual machine in either the cloud pool 16 or the local pool 14 available as a test node for the developer client 12. Accordingly, the expediter can balance and manage available resources for the verification system 10.

Figure 2:
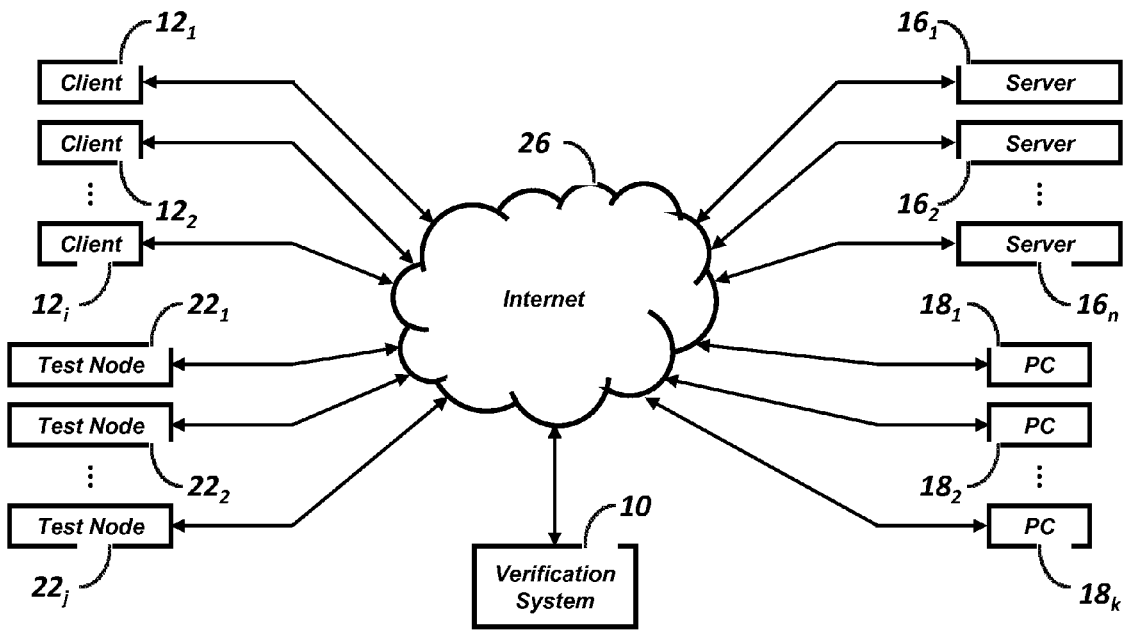
FIG. 2 is a schematic block diagram of a cloud computing environment having a software verification system constructed according to the principles of the present invention.

Referring now to FIG. 2, a web application verification system 10 useful during the development and verification of web applications is shown; as such term has been defined above. Generally, a user at a client 12 is desirous of verifying that a web application residing on a server 16 is compatible with a platform configuration of a device 18 that may be used to connect to the server 16 for purposes of running via its user interface the web application. The device 18 may be any type of personal computer or other type of web connected device in which a web browser provides a user interface. The user at the client 12 typically has some interest in the web application, such as being the developer of part or all thereof, or otherwise being employed or authorized by the owner or developer of such web application to perform such compatibility verification.

As described in greater detail hereinafter, the user at the client 12 connects to the web application verification system 10 and through the user interface of a client browser running on the client 12 informs the application verification system 10 of a specific platform configuration against which the web application at the server 16 is to be verified for compatibility. The application verification system 10 is then operative to locate a test node 22 having the specific platform configuration and launch a test browser on the test node 22.

While the client 12 is connected to the application verification system 10, the user at the client 12 through the interface of the client browser instructs the application verification system 10 to cause test browser on the test node 22 to navigate to the location of web application on the server 16. Once a connection has been established between the test node 22 and the server 16, the user at the client 12 then further instructs through the client browser the application verification system 10 to cause the test browser at the test node 22 to enter one or more commands on the web application wherein for each command entered the results of execution of such command by the web application are returned to the test node 22 and then to the system 10. The user at the client 12 may then view such results in the interface of the client browser at the client 12.

It is contemplated that the application verification system 10 is preferably operative in a cloud computing environment in which the client 12, server 16 and the test node 22 are in communication with the application verification system 10 over a network 26 such as the Internet. In such an environment, the application verification system 10 may be a hosted website.

It is also contemplated that the application verification system 10 is accessible from users at a plurality of clients $12_{1-i}$. Moreover, the application verification system 10 has available to it a plurality of test nodes $22_{1-j}$ to accommodate multiple users, each verifying one or more web applications respectively on servers $16_{1-n}$, and multiple platform configurations.

The test nodes $22_{1-j}$ may be any of static or virtual servers and may reside collocated with the same server at which the application verification system 10 is hosted or reside at any server farm from which servers may be obtained as a service. Moreover, any one of the test nodes $22_{1-j}$ may also be a discrete platform such as a network connected device, such as a tablet, smart phone or computer, subject to human intervention and control. Each of the test nodes $22_{1-j}$ has a respective one of the test browsers running thereon.

Preferably, the test nodes $22_{1-j}$ are virtual servers available on demand from an elastic cloud service, for example the Amazon EC2 service. As described further below, an elastic cloud service allows the test nodes $22_{1-j}$ to be readily configurable into having the specified platform configuration determined from any combination of operating systems and web browsers, as well as their respective versions, which may be found in any of a plurality of Internet connected devices $18_{1-k}$ in which web applications may be run through a browser interface.

Figure 3:
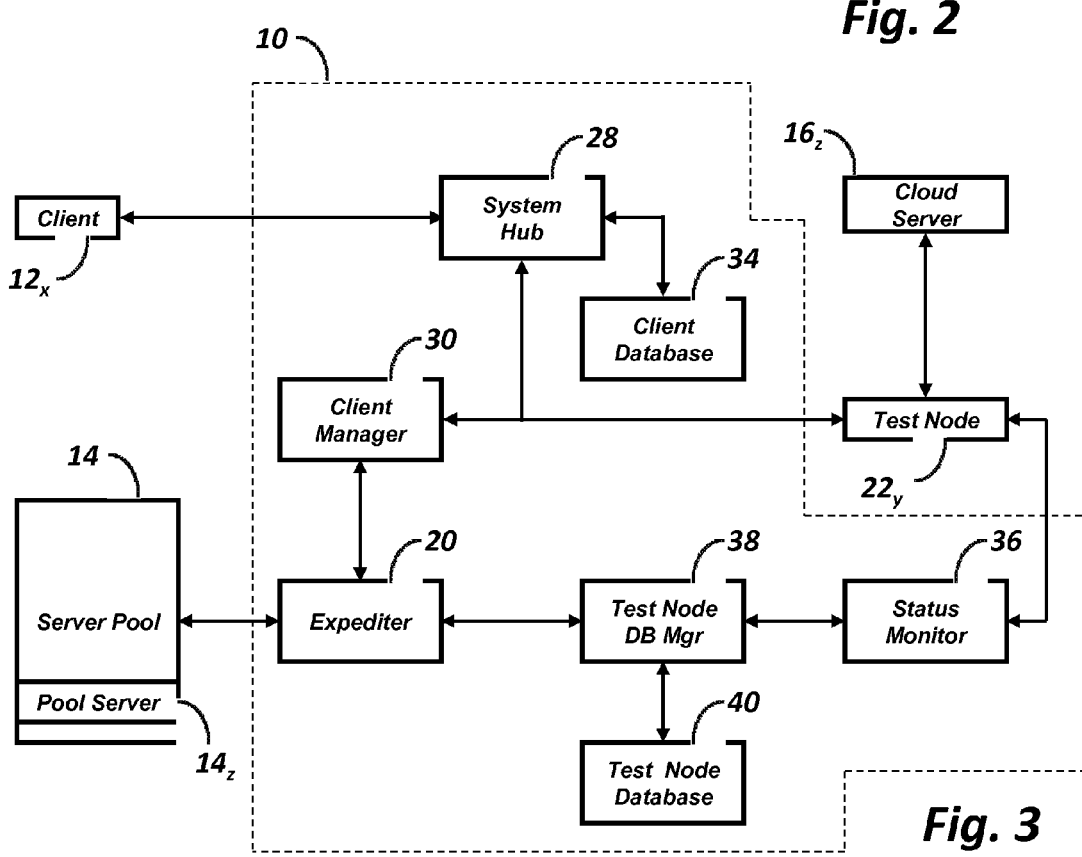
FIG. 3 is a detailed block diagram of the software verification system of FIG. 2.

With reference to FIG. 3, the application verification system 10 includes an entry hub 28, a client manager 30 and an expediter 20. A user at the client $12_x$, which may be any one of the clients $12_{1\text{-}i}$ (FIG. 2), connects to the application verification system 10 conventionally through the user interface of its respective client browser. Through such interface, the user can then indicate that a verification procedure is to be initiated by accessing the entry hub 28. Optionally, authentication of user credentials may be required to authorize access to the entry hub 28.

The client manager 30, upon the connection having been established, then initiates communication with the client $12_x$ as it becomes connected. More particularly, the client manager 30 sends an HTTP header to the clients $12_x$ to start a verification session therewith. The user at the client $12_x$ that has initiated a session may then specify to the client manager 30 through the interface of the client browser of such user's client $12_x$ the platform upon which the verification for the current session is to occur.

The client manager further issues a session ID for the session client $12_x$ through which transactions with and within the application verification system 10 relating to this client $12_x$ may be registered. The client manager 30 keeps a record of each session ID and the platform to be used for each session for all such clients 121-i (FIG. 2) that may be connected. In one embodiment of the present invention, a client database 34 may be used to keep such record.

The expediter 20 is operative to monitor instances of any new sessions initiated by the client manager 30, exemplarily by repeatedly querying the client database 34. Upon the expediter 32 being cognizant of a new session, the expediter 32 attempts to locate the test node $22_y$ from all the test nodes $22_{1\text{-}j}$ (FIG. 2) that has the same platform configuration as the platform specified for the session. If the requisite test node $22_y$ is located, the expediter 32 then instructs such test node $22_y$ to launch its respective test browser. The expediter 32 then informs the client manager 30 of the availability of the platform configuration for the session and gives the client manager 30 the location of the available test node $22_y$.

Knowing the location of the available test node $22_y$, the client manager 30 may then connect to the available test node $22_y$ and further make such availability of the test node $22_y$ known to the session client $12_x$. With the client manager 30 operative as an intermediary, the user at the session client $12_x$ may now through the interface of the client browser thereat enter a series of commands, which may exemplarily be Selenium API calls, that are sent to the available test node such that the commands are acted upon by the test browser at the test node 22y and the responses recorded. Typically an initial command would be an instruction for the test browser at the test node $22_y$ to navigate to the location, exemplarily given by a URL, of a web application under test residing at the server $16_z$.

An end or stop command signifies that the verification session of web application under test by the test browser is to be terminated. At such termination, the results of the verification session are sent to the client manager 30 for viewing by or uploading to the session client $12_x$. The results of the verification session may include data relating to processes of the test browser executing on the test node $22_y$ for each command and associated response. The results may also include a video of the test browser $22_y$ session, which may exemplarily be taken through a virtual network computer to record the user interface of the test browser $22_y$ as command are given and response made. Moreover, in accordance with the present invention, such video of the screen shots of the test browser $22_y$ session are synchronized with the data relating to processes of the test browser.

The application verification system 10 as described above is also able to test any one of the web applications that may reside on any one of the servers 161-n should such one of the servers reside behind a secure firewall instead of a publicly accessible site. In such event, the application verification system 10 may request to create a VPN tunnel to create a mapping to the server behind the secure firewall. The VPN tunnel need only be modified to allow the client manager to act as the intermediary as described above.

In accordance with the present invention, the expediter 32 not only determines the availability, as described above, of any one of the test nodes $22_{1\text{-}j}$ for a newly initiated session but further may be operative to launch new ones of the test nodes $22_{1\text{-}j}$ as the need arises should a platform specified for the newly initiated session not currently be available. Accordingly, the expediter 20 is tasked with being made cognizant of the current status of all available test nodes $22_{1\text{-}j}$. The status is whether any one of the test nodes $22_{1\text{-}j}$ is idle, thus is currently available for a new session, or busy with a current session. It is to be recognized that the total number of all such test nodes $22_{1\text{-}j}$ irrespective of the current status of each is not an absolute or predetermined number but varies as is known in response to the demand for platforms in the elastic cloud computing environment.

To keep a current record of the status of each of the test nodes $22_{1\text{-}j}$, the software testing system may further include a status monitor 36, test node database manager 38 and a test node database 40. As the status of each of the test nodes $22_{1\text{-}j}$ becomes know or changes, the status monitor 36 is operable to provide such status to the test node database manager 38 which in turn stores such status in the test node database 40 in association with the identified one of the test nodes $22_{1\text{-}j}$. Accordingly, by implementing a query of the test node database manager 38, the expediter 20 is always cognizant of the status of each of the test nodes $22_{1\text{-}j}$.

The status monitor 36 monitors the elastic cloud in which the test nodes $22_{1\text{-}j}$ reside to know when such the test nodes $22_{1\text{-}j}$ come on line, are idle or busy using known implementation techniques that have been developed for platform as service in elastic cloud computing environments. A java script object notation protocol may be used in an exemplary implementation.

As described above, the expediter 20 is operative to launch new ones of the test nodes $22_{1\text{-}j}$ as the need arises. The session for which a new one of the test nodes $22_{1\text{-}j}$ is need is placed in a queue by the client manager 30 while awaiting for a new one of the test nodes $22_{1\text{-}j}$ to come online and be made available for such session. However, in an elastic cloud the wait for any user of one of the clients $12_{1\text{-}i}$ could result in an unacceptably long time delay for a user who expects the verification process to occur in real time. For example, in an elastic cloud, it may take up to 15 minutes or even more for a new one of the test nodes $22_{1\text{-}j}$ to come online and be made available.

To mitigate such delays, the software verification system 10 may further include a local standby server pool 14 containing a preselected number of servers, each able to function and interact with the software verification system 10 similarly as described above for each one of the test nodes $22_{1\text{-}j}$. Each of the servers of the server pool 14 may also be any of static or virtual servers. In the event the expediter 20 does not find an available server having the platform required for the session in the test node database 40, then the expediter 20 will launch pool server $14_z$ with the requisite platform.

Since the server pool 14 is under the control of the software verification system 10, and more particularly the expediter 20, the pool server $14_z$ may be launched and be made available on line in approximately 10 seconds, thereby mitigating the delay experienced by the user and allowing substantially near real time interaction with the software verification system 10.

Moreover, the expediter 20 may also track the usage level of the server pool 14 and should such overall usage approach a predetermined threshold, the expediter 20 may then cause to be launched additional ones of the test nodes $22_{1-j}$ with an idle status to meet future demand. The server pool may also be used as "sandbox" servers for users who may desire to use the verification system 10 on a trial basis.

There has been described above a novel host based web application testing system and method. Those skilled in the art may now make numerous uses of, and departures from, the above described embodiments without departing from the inventive concepts disclosed herein.

What is claimed is:

1. A software verification system to verify compatibility of a web application with at least one of a plurality of platforms from one of a plurality of clients in which each of the clients includes a client browser, the verification system comprising:
    a cloud service pool of servers, each of the servers hosting a plurality of virtual machines, each of the virtual machines being one of a plurality of test nodes, each of the test nodes running one of the platforms in which each of the platforms has a test browser;
    an expediter cognizant of the network address of each of the test nodes and the platforms available in the test nodes; and
    a client manager which in response to one of the plurality of clients requesting a verification session to use a specified one of the platforms obtains from the expediter the network address of an available one of the of test nodes running the specified one of the platforms, and wherein the client manager transmits the network address to the requesting one of the clients which then connects the requesting one of the clients to the available one of the test nodes running the specified one of the platforms,
    wherein if the specified one of the platforms is not available in the test nodes, the verification system further comprising:
    a local pool of servers hosting a least one further virtual machine configured with the specified one of the platforms as an additional available one of the test nodes, the additional available one of the test nodes being connected by the client manager with the requesting one of the clients, the requesting one of the clients when connected to the available one of the test nodes causes the test browser at the available one of the test nodes to navigate to the location of the web application further causes the test browser to enter at least one command to the web application wherein the results of execution of the command are returned to the test browser at the available one of the test nodes and data relating to the results being made viewable by the client manager at the requesting one of the clients.

2. The system of claim 1 further comprising a status monitor which determines the status of each of the plurality of test nodes and provides such status to a test node database manager which stores each status in a test node database, wherein the test node database manager is operable to provide the status of each of the plurality of test nodes to the expediter wherein the status includes at least the current availability, platform configuration and network location of each of the test nodes.

3. The system of claim 1 further comprising a video interface which collects frame buffer information of the test browser operating at the available one of the test nodes and transmits the information through the connection between the requesting one of the clients and the available one of the test nodes.

4. The system of claim 1 further comprising an image cache which stores a plurality of screen images wherein each of the images is an image of the test browser taken subsequent to the execution of the command.

5. The system of claim 1 wherein the further virtual machine is started using a stored image of the specified platform.

6. A method for verifying the compatibility of a web application with at least one of a plurality of platforms from one of a plurality of clients in which each of the clients includes a client browser, the method comprising the steps of:
    configuring each of a plurality of servers to host a plurality of virtual machines in a cloud service pool of servers;
    running a respective one of the platforms on each of the plurality of virtual machines as one of a plurality of test nodes;
    recognizing a plurality of available platforms for use by the plurality of test nodes in each of a cloud service pool of servers and a local pool of servers;
    obtaining a network address of an available one of the plurality of test nodes running the specified platform when one of the plurality of clients requests to use a specific platform;
    transmitting the network address to the requesting client which then connects the requesting client to the available test node running the requested platform; and
    wherein if the specific platform is not available, the method further comprising the steps of starting a new virtual machine, located in a local pool of servers, having the requested platform wherein the new virtual machine is an additional one of the test nodes and connecting the additional one of the test nodes with the requesting client, the requesting client when connected to the available one of the test nodes causes the test browser at the available one of the test nodes to navigate to the location of the web application and further causes the test browser to enter at least one command on the web application wherein the results of execution of the command are returned to the available one of the test nodes and viewable at the client browser at the requesting client.

7. The method of claim 6 further comprising determining the status of each of the plurality of test nodes and providing such status to a database manager for storing each status in a test node database, wherein the test node manager is operable to provide the status of each of the plurality of test nodes wherein the status includes at least the current availability, platform configuration and network location of each of the test nodes.

8. The method of claim 6 further comprising collecting frame buffer information of the test browser operating at the available one of the test nodes and transmitting the information through the connection between the requesting client and the available one of the test nodes.

9. The method of claim 6 further comprising storing a plurality of screen images in an image cache wherein each of the images is an image of the test browser taken subsequent to the execution of the command.

10. The method of claim 9 wherein the new virtual machine located in the local pool of servers is started using a stored image of the requested platform.

11. A software verification system to enable verification from a network connected client of the compatibility of a web application with at least one of a plurality of predetermined platform configurations wherein the web application is accessed from at least one of a plurality of network connected test nodes wherein each of said test nodes has a respective one of the predetermined platform configurations, each of the platform configurations having a test browser, the verification system comprising:
- an expediter cognizant of a network location of each of the test nodes and the platform configuration of each respective one of the test nodes; and
- a client manager which in response to the network connected client requesting a session to use a desired one of the platform configurations obtains from the expediter the network location of an available one the test nodes having the platform configuration commensurate with the desired one of the platform configurations, the client manager in response thereto connects the client to the available one of the test nodes upon which the client transmits to the available one of said test nodes a URL of a web location at which the web application is operable such that the client is enabled to instruct the test browser at the available one of the test nodes to navigate to the web location and further instruct the test browser to execute an instruction set in the web application wherein data is collected by the client manager upon execution of each instruction of the instruction set for subsequent transmission to the client.

12. The verification system as set forth in claim 11 wherein, in the event none of the test nodes has the platform configuration commensurate with the desired one of the platform configurations, the expediter is operative to launch a new one of the test nodes having the desired one of the platform configurations.

13. The verification system as set forth in claim 12 wherein each of the test nodes is a virtual platform in a cloud server system and the new one of the test nodes is a virtual platform in the cloud server system.

14. The verification system as set forth in claim 12 wherein each of the test nodes is a virtual platform in a cloud server system and the new one of the test nodes is a virtual platform in a pool server system local with the verification system.

15. The verification system as set forth in claim 14 wherein the expediter is further operative to launch a further new one of the test nodes in the cloud server system having a platform configuration substantially similar to said platform configuration of the new one of the test nodes in said pool server system such that upon completion of the instruction set the client manager is operative to connect the client to the further new one of the test nodes.

16. The verification system as set forth in claim 11 wherein the available one of said test nodes is a discrete platform network connected to the client manager.

17. The verification system as set forth in claim 16 wherein the discrete platform one of the test nodes is subject to human intervention and control in accordance with the instruction set.

18. The verification system as set forth in claim 11 wherein the collected data is a selected one of screen shots of the test browser and a video of the test browser at the available one of said test nodes.

19. The verification system as set forth in claim 11 wherein said verification system further includes:
- a status monitor operable to obtain a current status of each of the test nodes wherein the status includes at least the current availability, platform configuration and network location of each of the test nodes;
- a database populated with the current status of each of the test nodes; and
- a database manager in communication with each of the status monitor, the database and the expediter and operable to populate the database the said current status obtained by the status monitor and to inform the expediter of the current status upon inquiry therefrom.

* * * * *